(12) United States Patent
Dosen et al.

(10) Patent No.: US 6,779,844 B2
(45) Date of Patent: Aug. 24, 2004

(54) ARCHING LUMBAR SUPPORT WITH WEIGHT DISTRIBUTION SURFACE

(75) Inventors: Dragan Dosen, Windsor (CA); Larry Janzen, Harrow (CA)

(73) Assignee: L&P Propety Maqnagement Company, South Gate, CA (US)

( * ) Notice: Subject to any disclaimer, the term of this patent is extended or adjusted under 35 U.S.C. 154(b) by 72 days.

(21) Appl. No.: 10/017,334

(22) Filed: Dec. 14, 2001

(65) Prior Publication Data

US 2003/0111884 A1 Jun. 19, 2003

(51) Int. Cl.⁷ .................................................. A47C 3/025
(52) U.S. Cl. .................................. 297/284.4; 297/284.7
(58) Field of Search ........................................ 297/284.4

(56) References Cited

U.S. PATENT DOCUMENTS

| | | |
|---|---|---|
| 1,182,854 A | 5/1916 | Poler |
| 2,756,809 A | 7/1956 | Endresen |
| 2,843,195 A | 7/1958 | Barvaeus |
| 2,942,651 A | 6/1960 | Binding |
| 3,378,299 A | 4/1968 | Sandor |
| 3,490,084 A | 1/1970 | Schuster |
| 3,492,768 A | 2/1970 | Schuster |
| 3,724,144 A | 4/1973 | Schuster |
| 3,762,769 A | 10/1973 | Poschl |
| 4,014,422 A | 3/1977 | Morishita |
| 4,136,577 A | 1/1979 | Borgersen |
| 4,153,293 A | 5/1979 | Sheldon |
| 4,156,544 A | 5/1979 | Swenson et al. |
| 4,182,533 A | 1/1980 | Arndt et al. |
| 4,295,681 A | 10/1981 | Gregory |
| 4,313,637 A | 2/1982 | Barley |
| 4,316,631 A | 2/1982 | Lenz et al. |
| 4,354,709 A | 10/1982 | Schuster |
| 4,390,210 A | 6/1983 | Wisniewski et al. |
| 4,449,751 A | 5/1984 | Murphy et al. |
| 4,452,485 A | 6/1984 | Schuster |

(List continued on next page.)

FOREIGN PATENT DOCUMENTS

| | | | |
|---|---|---|---|
| AT | 401 497 | 9/1996 | ............ B60N/2/22 |
| DE | 2040794 | 7/1971 | ............ A47C/7/28 |
| DE | 206 4419 | 7/1972 | ............ B60N/1/06 |
| DE | 29 47 472 | 8/1980 | ............ B60N/1/00 |
| DE | 201 07 424 U1 | 11/2001 | ............ B60N/2/62 |
| EP | 0 006 840 B1 | 2/1982 | ............ A47C/23/00 |
| EP | 0 169 293 B1 | 10/1988 | ............ A47C/7/46 |
| EP | 0 322 535 A1 | 7/1989 | ............ A47C/7/46 |
| EP | 0 485 483 B1 | 1/1994 | ............ A47C/7/46 |
| EP | 0 434 660 B1 | 5/1995 | ............ A47C/7/46 |
| EP | 0 540 481 B1 | 12/1995 | ............ A47C/7/46 |
| EP | 0 662 795 B1 | 12/1996 | ............ A47C/7/46 |
| EP | 0 702 522 B1 | 3/1997 | ............ A47C/7/46 |
| EP | 0 696 251 B1 | 7/1997 | ............ B60N/2/44 |
| EP | 0 746 219 B1 | 11/1998 | ............ A47C/7/46 |
| EP | 0 797 399 B1 | 11/1998 | ............ A47C/7/46 |
| EP | 0 698 360 B1 | 3/2000 | ............ A47C/7/46 |
| FR | 2 596 334 | 10/1987 | ............ B60N/1/06 |
| GB | 849 798 | 9/1960 | |
| GB | 1 423 617 | 2/1976 | ............ A47C/7/46 |
| GB | 2 013 487 | 2/1978 | ............ A47C/7/46 |
| RU | 587924 | 2/1978 | ............ A47C/7/46 |
| WO | WO/00/00064 | 1/2000 | ............ A47C/3/025 |

OTHER PUBLICATIONS

International Search Report for PCT/US02/39798, Mailed Apr. 24, 2003.

*Primary Examiner*—Anthony D. Barfield
(74) *Attorney, Agent, or Firm*—Grant D. Kang; Dennis J M Donahue, III; Husch & Eppenberger LLC

(57) ABSTRACT

An ergonomic weight support device for a seat has a weight distribution surface attached to a traction arching lumbar support. The weight distribution surface is only attached at the apex of the arch of the arching pressure surface. The upper and lower ends of the weight distribution surface are free to flex between a passenger's spine and the arch, distributing the passenger's weight for greater comfort.

32 Claims, 2 Drawing Sheets

U.S. PATENT DOCUMENTS

| | | | | |
|---|---|---|---|---|
| 4,465,317 | A | 8/1984 | Schwarz | |
| 4,494,709 | A | 1/1985 | Takada | |
| 4,541,670 | A | 9/1985 | Morgenstern et al. | |
| 4,555,140 | A | 11/1985 | Nemoto | |
| 4,556,251 | A | 12/1985 | Takagi | |
| 4,561,606 | A | 12/1985 | Sakakibara et al. | |
| 4,564,235 | A | 1/1986 | Hatsutta et al. | |
| 4,565,406 | A | 1/1986 | Suzuki | |
| 4,576,410 | A | 3/1986 | Hattori | |
| 4,601,514 | A | 7/1986 | Meiller | |
| 4,602,819 | A | 7/1986 | Morel | |
| 4,627,661 | A | 12/1986 | Ronnhult et al. | |
| 4,632,454 | A | 12/1986 | Naert | |
| 4,676,550 | A | 6/1987 | Neve De Mevergnies | 297/353 |
| 4,679,848 | A | 7/1987 | Spierings | |
| 4,730,871 | A | 3/1988 | Sheldon | 297/230 |
| 4,880,271 | A | 11/1989 | Graves | |
| 4,909,568 | A | 3/1990 | Dal Monte | |
| 4,915,448 | A | 4/1990 | Morgenstern | |
| 4,950,032 | A | 8/1990 | Nagasaka | |
| 4,957,102 | A | 9/1990 | Tan et al. | |
| 4,968,093 | A | 11/1990 | Dal Monte | 297/284 |
| 5,005,904 | A | 4/1991 | Clemens et al. | 297/284 |
| 5,022,709 | A | 6/1991 | Marchino | 297/452 |
| 5,026,116 | A | 6/1991 | Dal Monte | 297/284 |
| 5,050,930 | A | 9/1991 | Schuster et al. | 257/284 |
| 5,076,643 | A | 12/1991 | Colasanti et al. | 297/284 |
| 5,088,790 | A | 2/1992 | Wainwright et al. | 297/284 |
| 5,137,329 | A | 8/1992 | Neale | 297/284 |
| 5,174,526 | A | 12/1992 | Kanigowski | 244/122 |
| 5,186,412 | A | 2/1993 | Park | 242/245 |
| 5,197,780 | A | 3/1993 | Coughlin | 297/284.7 |
| 5,215,350 | A | 6/1993 | Kato | 297/284.4 |
| 5,217,278 | A | 6/1993 | Harrison et al. | 297/284.7 |
| 5,286,087 | A | 2/1994 | Elton | 297/284.7 |
| 5,299,851 | A | 4/1994 | Lin | 297/284.5 |
| 5,335,965 | A | 8/1994 | Sessini | 297/284.4 |
| 5,385,531 | A | 1/1995 | Jover | 601/99 |
| 5,397,164 | A | 3/1995 | Schuster | 297/284.1 |
| 5,423,593 | A | 6/1995 | Nagashima | 297/284.5 |
| 5,449,219 | A | 9/1995 | Hay et al. | 297/284.4 |
| 5,452,868 | A | 9/1995 | Kanigowski | 244/122 R |
| 5,474,358 | A | 12/1995 | Maeyaert | 297/284.7 |
| 5,498,063 | A | 3/1996 | Schuster et al. | 297/284.1 |
| 5,518,294 | A | 5/1996 | Ligon, Sr. et al. | 297/284.4 |
| 5,553,917 | A | 9/1996 | Adat et al. | 297/230.14 |
| 5,562,324 | A | 10/1996 | Massara et al. | 297/284.6 |
| 5,567,010 | A | 10/1996 | Sparks | 297/284.4 |
| 5,567,011 | A | 10/1996 | Sessini | 297/284.4 |
| 5,588,703 | A | 12/1996 | Itou | 297/284.4 |
| 5,609,394 | A | 3/1997 | Ligon, Sr. et al. | 297/284.4 |
| 5,626,390 | A | 5/1997 | Schuster et al. | 297/284.1 |
| 5,638,722 | A | 6/1997 | Klingler | 74/502.4 |
| 5,651,583 | A | 7/1997 | Klingler et al. | 297/284.4 |
| 5,651,584 | A | 7/1997 | Chenot et al. | 297/284.4 |
| 5,704,687 | A | 1/1998 | Klingler | 297/284.4 |
| 5,718,476 | A | 2/1998 | De Pascal et al. | 297/284.4 |
| 5,758,925 | A | 6/1998 | Schrewe et al. | 297/284.6 |
| 5,762,397 | A | 6/1998 | Venuto et al. | 297/284.4 |
| 5,769,491 | A | 6/1998 | Schwarzbich | 297/284.4 |
| 5,772,281 | A | 6/1998 | Massara | 297/284.4 |
| 5,775,773 | A | 7/1998 | Schuster et al. | 297/284.1 |
| 5,791,733 | A | 8/1998 | Van Hekken et al. | 297/284.4 |
| 5,816,653 | A | 10/1998 | Benson | 297/284.4 |
| 5,823,620 | A | 10/1998 | Le Caz | 297/284.4 |
| 5,857,743 | A | 1/1999 | Ligon, Sr. et al. | 297/284.9 |
| 5,868,466 | A | 2/1999 | Massara et al. | 297/284.6 |
| 5,884,968 | A | 3/1999 | Massara | 297/216.12 |
| 5,897,168 | A | 4/1999 | Bartelt et al. | 297/452.18 |
| 5,911,477 | A | 6/1999 | Mundell et al. | 297/284.4 |
| 5,913,569 | A | 6/1999 | Klingler | 297/284.4 |
| 5,934,752 | A | 8/1999 | Klingler | 297/284.4 |
| 5,975,632 | A | 11/1999 | Ginat | 297/284.4 |
| 5,984,407 | A | 11/1999 | Ligon, Sr. et al. | 297/284.4 |
| 5,988,745 | A | 11/1999 | Deceuninck | 297/284.4 |
| 6,003,941 | A | 12/1999 | Schuster, Sr. et al. | 297/284.1 |
| 6,007,151 | A | 12/1999 | Benson | 297/284.4 |
| 6,030,041 | A | 2/2000 | Hsiao | 297/284.4 |
| 6,036,265 | A | 3/2000 | Cosentino | 297/284.4 |
| 6,045,185 | A | 4/2000 | Ligon, Sr. et al. | 297/284.4 |
| 6,050,641 | A | 4/2000 | Benson | 297/284.4 |
| 6,079,783 | A | 6/2000 | Schuster, Sr. et al. | 297/284.4 |
| 6,092,871 | A | 7/2000 | Beaulieu | 297/284.4 |
| 6,152,531 | A | 11/2000 | Deceuninck | 297/284.4 |
| 6,152,532 | A | 11/2000 | Cosentino | 297/284.4 |
| 6,158,300 | A | 12/2000 | Klingler | |
| 6,227,617 | B1 | 5/2001 | Von Möller | 297/284.4 |
| 6,227,618 | B1 | 5/2001 | Ligon, Sr. et al. | 297/284.4 |
| 6,254,186 | B1 | 7/2001 | Falzon | 297/284 |
| 6,254,187 | B1 | 7/2001 | Schuster, Sr. et al. | 297/284.1 |
| 6,270,158 | B1 | 8/2001 | Hong | 297/284.4 |
| 6,296,308 | B1 | 10/2001 | Cosentino et al. | 297/284.4 |
| 6,334,651 | B1 | 1/2002 | Duan et al. | 297/284.4 |
| 6,682,144 | B2 * | 1/2004 | Klingler | 297/284.4 X |

* cited by examiner

ARCHING LUMBAR SUPPORT WITH WEIGHT DISTRIBUTION SURFACE

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates generally to a weight distribution surface for arching lumbar support devices, for seats.

2. Related Art

Lumbar supports for seats, particularly automobile seats, are known. See U.S. Pat. Nos. 4,354,709; 4,452,485; 4,632,454; 4,880,271; 5,050,930; 5,397,164; 5,498,063; 5,626,390; 5,775,773; 6,003,941; GB 2 013 487A and D 169 293 B1. These devices all have in common a pressure surface that may be flexed in order to create a convex surface with its apex towards the lumbar spine of a human being sitting in the seat into which the device is incorporated. This convex flexion is induced by any of a great variety of means for compression, see, e.g., U.S. Pat. No. 4,354,709, or tension, see, e.g., U.S. Pat. No. 5,498,063. Typical prior art lumbar supports have both an upper extremity of the convex pressure element and a lower extremity of it anchored to a framework within the seat. These upper and lower elements are tensioned or compressed to move closer together to project the apex of the convexity farther out from the plane of the seat for greater lumbar support. Conversely, tension is released in order to move the apex of the convexity closer to the plane of the seat for less lumbar support. These devices provide little flexibility in the surface of the support proximal to the seat occupant, because that surface is encapsulated and under tension or compression.

All of these prior art lumbar supports are limited in the flexibility they are able to provide the surface that applies pressure to the passenger. Such pressure surface rigidity is less comfortable for the passenger.

Moreover, as seat designs are modified to incorporate more comfort devices, such as duct work for heating and cooling, the amount of space available inside seats for lumbar support devices shrinks. Smaller lumbar supports save space, but exacerbate the issue of pressure surface inflexibility and distribution of weight support.

There is a need in the art for a an ergonomic weight support which is more flexible at the surface that applies pressure to the passenger, which occupies no more space than prior supports, and which is inexpensive and easy to manufacture and install.

SUMMARY OF THE INVENTION

This invention is a weight distribution surface for ergonomic supports for seats, especially automobile seats.

The present invention uses a relatively small number of moving parts which are simple in design and movement. It is compact in size for ease of packaging and ease of incorporation into a variety of different seats including automobile seats. It may be incorporated at various positions and in various orientations. The present invention is economical to manufacture, sell, assemble, maintain and operate. It may be operated by a motor, mechanical means or a combination of the two. More than one support device may be incorporated in a single seat for a plurality of ergonomic supports, including but not limited to lumbar support, head/neck support, rib support and/or thigh support.

It is able to tolerate excessive or abusive loads.

The present invention eases and streamlines the manufacture of the device and of seats incorporating the device, to lower production costs and increase durability and useable life of the device and seats incorporating it. It may be incorporated easily with existing components, as, for example, seat frames or headrests, and with future seats which may have less space available within them. It does not require guide wires, outside actuators, attachment brackets or long cables.

Further features and advantages of the present invention, as well as the structure and operation of various embodiments of the present invention, are described in detail below, with reference to the accompanying drawings.

DETAILED DESCRIPTION OF THE PREFERRED EMBODIMENTS

Figure 1:
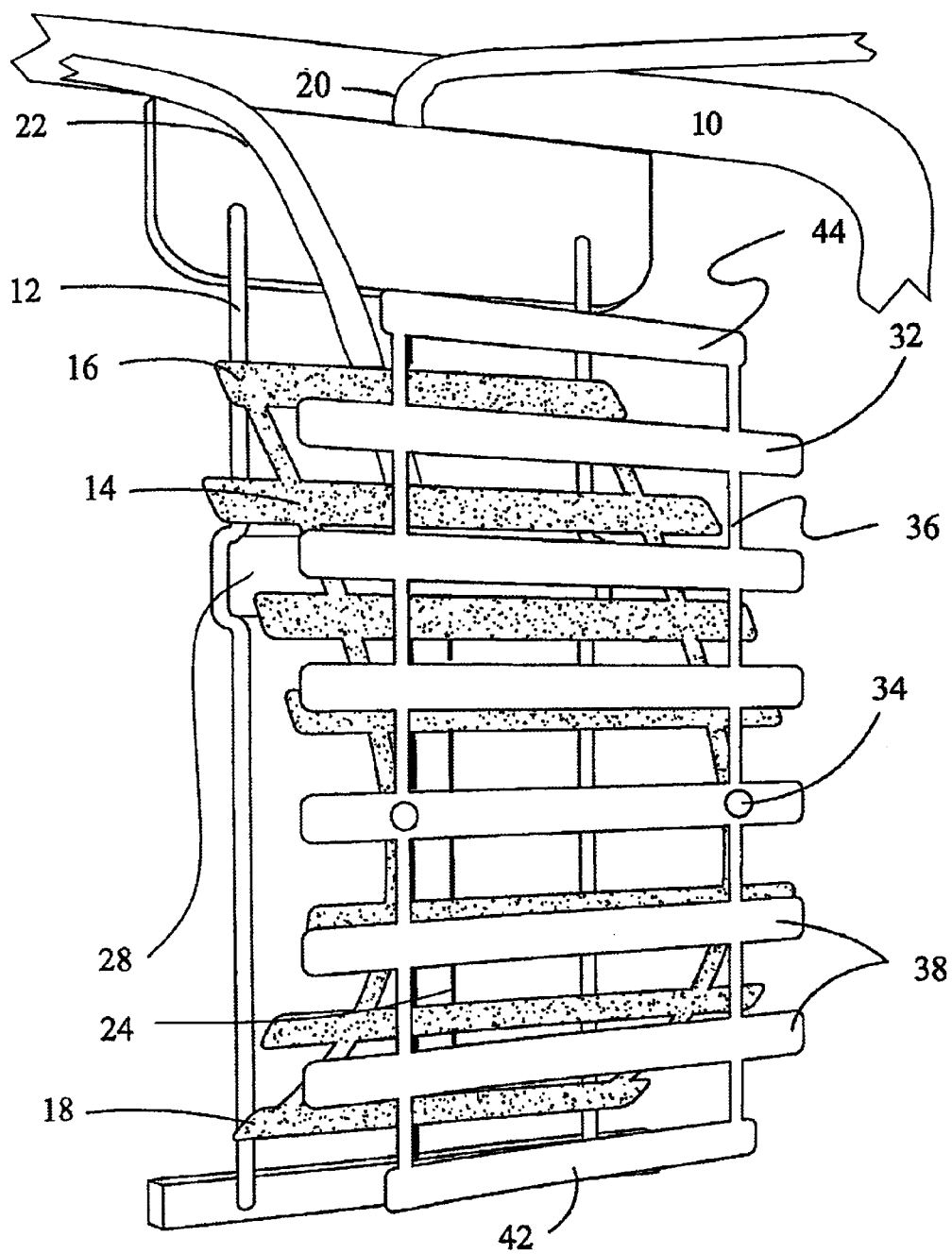
FIG. 1 is a perspective view of the weight distribution surface of the present invention combined with a conventional traction arching type lumbar support.

Referring to the accompanying drawings in which like reference numbers indicate like elements, FIG. 1 is a perspective view of the weight distribution surface of the present invention combined with a traction arching lumbar support. A seat frame, 10, has guide rails, 12, mounted on it. A conventional arching pressure surface, 14, is mounted on guide rails, 12, so that it can slide vertically along the guide rails, 12, at both its upper end, 16, and its lower end, 18. Various alternative traction arching lumbar supports have an upper or lower end of the arching pressure surface, 14, that are fixed and pivot without sliding along guide rails. The weight distribution surface of the present invention applies equally well to any such configuration. The archable pressure surface, 14, is arched by means of a traction device. Single bowden cables are often used to apply arching traction. In the depicted alternative embodiment, two bowden cables, 20 and 22, are attached to the lumbar support. Each bowden cable has a wire, 24, sliding axially through it. Any of a variety of configurations of bowden cable traction application are known in the art. In the depicted embodiment, bowden cable, 20, has its conduit or sleeve attached to a spring, 26, which is fixed at a bracket, 28. The wire, 24, extends out of the sleeve of bowden cable, 20, and is fixed to the lower end, 18, of arching pressure surface, 14. Spring, 26, mediates the tension applied through bowden cable, 20, and helps the unit tolerate abusive loads. A traction actuator, 30, powered by an electric motor, 46, may draw the wire, 24, into the sleeve of bowden cable, 20. The effect of this traction would be to draw lower end, 18, of arching pressure surface, 14, towards bracket, 28, creating an arch in the previously flat arching pressure surface, 14.

In the depicted alternative embodiment, an arch may also be created by the other bowden cable, 22, through a similar application of traction acting through a similar fixation of the sleeve end of bowden cable, 22, and the bowden cable wire end, which is obscured in FIG. 1. The effect of this traction is depicted, with top end, 16, of arching pressure surface, 14, being drawn down to create the arch depicted in FIGS. 1 and 3. In either direction, actuator, 30, can put traction on either bowden cable, 20 or 22, which arches the pressure surface, 14, from a flat to an arched position.

Arching pressure surface, 14, forms a pre-configured curve when it is arched. The arch has a pre-configured apex. Being under tension, arching pressure surface, 14, is relatively inflexible. This degree of rigidity is not optimally comfortable for all potential seat occupants. Rigid support is not optimally comfortable for a single occupant who may be in an automobile or an office furniture seat for a long period of time. Distribution of the seat occupant's weight across the lumbar supporting curve is more comfortable and more ergonomically beneficial if that weight is flexibly distributed. The weight distribution surface of the present invention more flexibly distributes the passenger's weight support when it is combined with the known traction arching lumbar support systems.

Weight distribution surface, 32, is fixedly attached to arching pressure surface, 14. The fixation point is at or near the apex of arching pressure surface, 14. Fixation may be had by any conventional means including without limitation, rivets, bolts, screws, spot welds and the like. In the depicted alternative embodiment, rivets, 34, fix weight distribution surface, 32, to arching pressure surface, 14. Like arching pressure surface, 14, the weight distribution surface, 32, may be made of a variety of materials, for example plastic or stamped metal. It may also be fabricated in a variety of ways, for example, molding plastic, stamping a single metal sheet, or fabricating an assembly of vertical members and lateral members. The weight distribution surface may be a flat solid surface, a surface having holes, or, as depicted, a surface having two vertical bands, 36, and several lateral cross members or ribs, 38.

The weight distribution achieved by the weight distribution surface of the present invention is achieved by maintaining its upper and lower aspects free of any fixation to the seat frame, guide rail assembly or arching pressure surface. Lower portion, 42, and upper portion, 44, of weight distribution surface, 32, hang freely, thus allowing their flexion when the seat occupant's weight is reclined against the lumbar support. The only fixation point of weight distribution surface, 32, is at apex rivets, 34.

Figure 2:
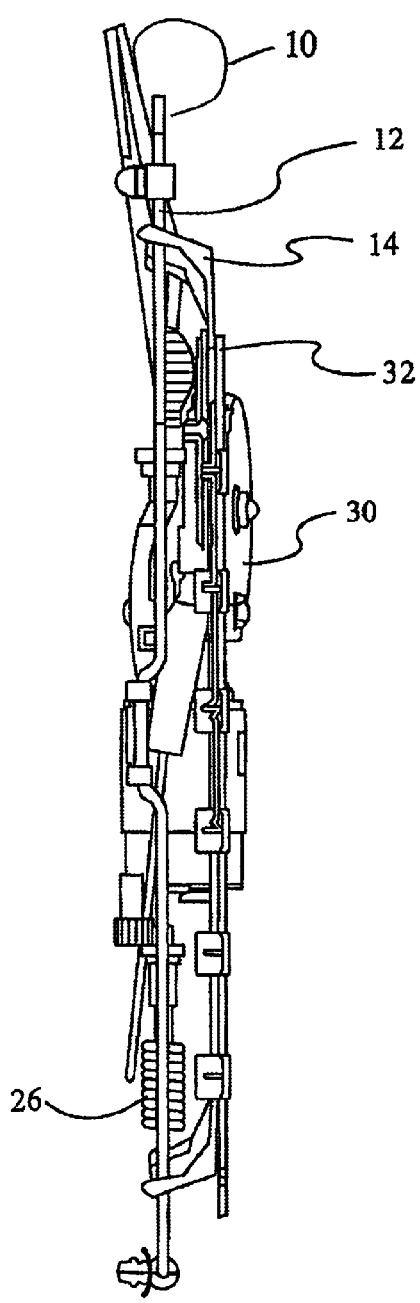
FIG. 2 is a side view of the weight distribution surface of the present invention combined with a traction arching lumbar support in the flat position.

FIG. 2 is a side view of a typical traction arching lumbar support incorporating the weight distribution surface of the present invention. It is apparent that in the lumbar support's flat position, the weight distribution surface, 32, adds very little bulk or thickness to the overall profile of the lumbar support unit. Weight distribution surface, 32, rests flat upon the flat arching pressure surface, 14, and is disposed flush with it on guide rails, 12.

Figure 3:
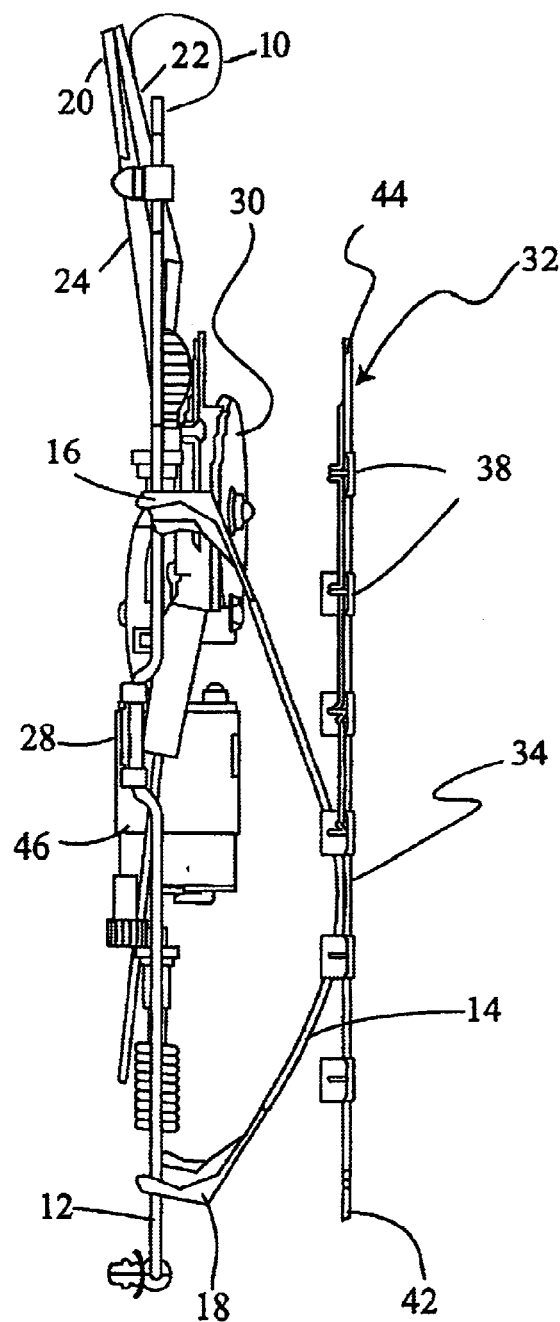
FIG. 3 is a side view of the weight distribution surface of the present invention combined with a traction arching lumbar support in the extended position.

FIG. 3 is a side view of a traction arching lumbar support incorporating the weight distribution surface of the present invention, in the arched position. FIG. 3 illustrates that while the upper end, 16, and lower end, 18, of arching pressure surface, 14, remain on guide rails, 12, the upper end, 44, and lower end, 42, of weight distribution surface, 32, are not fixed to any other part of the lumbar support unit. Weight distribution surface, 32, remains fixed to arching pressure surface, 14, only at apex rivets, 34. Accordingly, the lumbar supporting pressure of arching pressure surface, 14, is transferred to support the weight of a seat occupant reclining against the lumbar support in a distribution mediated by the weight distribution surface, 32, in order to flexibly accommodate the varying spines of various seat occupants, and alterations in the posture of a single occupant over time.

It will be appreciated by those of skill in the art that the flexible weight distribution surface of the present invention may either be designed as an integral part of newly developed lumbar supports, and may also be retrofitted to conventional lumbar supports. It is a further advantage of the present invention that it is simple to affix to pressure surfaces used in traction arcing type lumbar supports and therefore efficient and economical in its assembly, distribution and installation.

The flexible pressure plate of the present invention promotes passenger comfort by spreading the force of the lumbar support over a greater vertical range, which is more ergonomically appropriate for the human spine which extends over a range greater in its vertical dimension than current lumbar supports.

An alternative embodiment of the flexible pressure plate is tapered so that it is thicker at the apex of the lumbar support, at or near its fixation points, 34, and then tapers to a thinner depth towards its upper and lower edges. Such a design further promotes the flexibility of the pressure plate of the present invention.

The flexible pressure plate of the present invention is depicted as ribbed in the figures. It is considered to be within the scope of the present invention for the flexible pressure plate to be any shape, including without limitation rounded, rectangular circular, elliptical, waisted, ribbed or otherwise.

The present invention is advantageous in that it allows for greater freedom in mounting options than previously possible. The present invention may be mounted by bolts, springs, clamps, rivets, snaps, hooks, or any such equivalent. It may also be mounted "in suspension," that is, in cooperation with conventional wire or spring webs used to support a passengers weight. No mounting guide wires or rods are necessary, which further conserves space.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. An ergonomic lumbar support adapted for mounting within a seat having a seat cushion comprising:

at least two guide rods adapted to be internally mounted in a seat;

an archable pressure member having an upper end and a lower end, said upper end and said lower end of said archable pressure member being movably attached to said at least two guide rods and at least one of said upper end and said lower end being disposed to slide along said at least two guide rods and having an outer surface;

a traction element engaged to slide said at least one of said upper end and said lower end of said archable pressure surface along said at least two guide rods such that an arch forms in said archable pressure surface, said arch having an apex; and a weight distribution member having an outer surface and an inner surface, said inner surface being fixed to said outer surface of said archable pressure member and said outer surface of said weight distributed member being disposed to face the seat cushion.

2. The ergonomic support of claim 1 wherein said ergonomic support is a lumbar support.

3. The ergonomic support of claim 1 wherein said weight distribution member is fixed to said archable pressure member substantially at said apex.

4. The ergonomic support of claim 1 wherein said weight distribution member is fixed to said archable pressure member along only one line.

5. The ergonomic support of claim 1 wherein said weight distribution member is fixed only along a medial line about at said apex of said archable pressure member.

6. The ergonomic support of claim 1 wherein said weight distribution member is plastic.

7. The ergonomic support of claim 1 wherein said weight distribution member is metal.

8. The ergonomic support of claim 1 wherein at least one end of said weight distribution member is free.

9. The ergonomic support of claim 1 wherein said weight distribution member is ribbed.

10. The ergonomic support of claim 1 wherein said weight distribution surface has holes.

11. The ergonomic support of claim 1 wherein said weight distribution member is flexible.

12. The ergonomic support of claim 1 wherein said weight distribution member is curvilinear.

13. The ergonomic support of claim 1 wherein said weight distribution member is tapered towards an upper edge and tapered toward a lower edge of said weight distribution surface.

14. The ergonomic support of claim 1 wherein said archable pressure member is mounted to each of said at least two guide rods lateral to a vertical midline.

15. The ergonomic support of claim 1 wherein said distribution member is substantially as wide as said archable pressure surface.

16. The ergonomic support of claim 1 wherein said weight distribution member is substantially as high as said archable pressure surface.

17. The ergonomic support of claim 1 further comprising a seat on which said at least two guide rods are mounted.

18. The ergonomic support of claim 1 wherein said traction element is a Bowden cable.

19. The ergonomic support of claim 1 wherein said traction element is actuated by an actuator remote from said guide rods, said archable pressure member and said weight distribution member.

20. The ergonomic support of claim 1 wherein said traction element is actuated by an actuator mounted on a frame of the seat in which said ergonomic support is mounted.

21. The ergonomic support of claim 1 wherein said traction element is actuated by an electric motor.

22. A method of lumbar weight distribution within a seat having a seat cushion comprising:

mounting an archable pressure member to a at least two guide rods at an upper end and a lower end of said archable pressure member, said at least two guide rods being adapted to be internally mounted in a seat;

engaging a traction element with said archable pressure member such that at least one of said upper end and said lower end of said archable pressure member, travels along said at least two guide rods to selectively arch said archable pressure member;

fixing an inner surface of a weight distribution member to an outer surface of said archable pressure member such that an outer surface of said weight distribution member faces the seat cushion.

23. The method of claim 22 wherein said ergonomic support is a lumbar support.

24. The method of claim 22 wherein said weight distribution member is fixed to said archable pressure member substantially at an apex of said arch in said archable pressure member.

25. The method of claim 22 wherein said weight distribution is fixed to said archable pressure member along only one line.

26. The method of claim 22 wherein said weight distribution member is fixed only along a medial line about at said apex of said archable pressure member.

27. The method of claim 22 wherein said weight distribution member is plastic.

28. The method of claim 22 wherein at weight distribution member is metal.

29. The method of claim 22 wherein at least one end of said weight distribution member is free.

30. The method of claim 22 wherein said weight distribution member is ribbed.

31. A method of retrofitting a weight distribution device to a lumbar support device within a seat having a seat cushion comprising:

mounting an archable pressure member to a at least two guide rods at an upper end and a lower end of said archable pressure member, said at least two guide rods being internally mounted in the seat; engaging a traction element with said archable pressure member such that at least one of said upper end and said lower end of said archable pressure member, travels along said at least two guide rods to selectively arch said archable pressure member;

fixing an inner surface of a weight distribution member to an outer surface of the archable pressure member; and disposing an outer surface of said weight distribution member towards the seat cushion.

32. An ergonomic lumbar support adapted for mounting in a seat having a seat cushion comprising:

at least two guide rods rail adapted to be internally mounted in a seat;

an archable pressure member having an upper end and a lower end, means for movably attaching said upper end and said lower end of said archable pressure member to said at least two guide rods such that at least one of said upper end and said lower end of said archable pressure surface slide along said at least two guide rods;

a traction device to slide said at least one of said upper end and said lower end of said archable pressure surface along said at least two guide rods such that an arch forms in said archable pressure surface, said arch having an apex;

a weight distribution member between said archable pressure surface and the seat cushion; and an attachment of an inside face of said weight distribution member to an outside face of said archable pressure member.

* * * * *

UNITED STATES PATENT AND TRADEMARK OFFICE
CERTIFICATE OF CORRECTION

PATENT NO. : 6,779,844 B2 Page 1 of 1
DATED : August 24, 2004
INVENTOR(S) : Dragan Dosen and Larry Janzen It is certified that error appears in the above-identified patent and that said Letters Patent is hereby corrected as shown below:

Title page,
Item [73], Assignee, please change "L & P Propety Maqnagement Company" to read:
-- L & P Property Management Company --

Signed and Sealed this

Twenty-fifth Day of January, 2005

JON W. DUDAS
*Director of the United States Patent and Trademark Office*